(12) United States Patent
Denmead et al.

(10) Patent No.: US 10,112,436 B2
(45) Date of Patent: Oct. 30, 2018

(54) CENTRE-LOCK ATTACHMENT ARRANGEMENT FOR COMPOSITE WHEELS

(71) Applicant: Carbon Revolution Limited, Waurn Ponds, Victoria (AU)

(72) Inventors: Ashley James Denmead, Belmont (AU); Matthew Edward Dingle, Torquay (AU)

(73) Assignee: Carbon Revolution Limited, Waurn Ponds (AU)

( * ) Notice: Subject to any disclaimer, the term of this patent is extended or adjusted under 35 U.S.C. 154(b) by 297 days.

(21) Appl. No.: 14/913,428

(22) PCT Filed: Mar. 27, 2014

(86) PCT No.: PCT/AU2014/000324
§ 371 (c)(1),
(2) Date: Feb. 22, 2016

(87) PCT Pub. No.: WO2015/027271
PCT Pub. Date: Mar. 5, 2015

(65) Prior Publication Data
US 2016/0207351 A1    Jul. 21, 2016

(30) Foreign Application Priority Data

Aug. 30, 2013 (AU) ............................... 2013903314

(51) Int. Cl.
*B60B 3/14* (2006.01)
*B60B 5/02* (2006.01)
(Continued)

(52) U.S. Cl.
CPC .............. *B60B 3/142* (2013.01); *B60B 3/004* (2013.01); *B60B 3/14* (2013.01); *B60B 3/16* (2013.01);
(Continued)

(58) Field of Classification Search
CPC ........... B60B 3/14; B60B 3/142; B60B 3/147; B60B 3/12
See application file for complete search history.

(56) References Cited

U.S. PATENT DOCUMENTS 4,478,458 A * 10/1984 Flexman ................... B60B 3/14
301/35.57
5,492,391 A    2/1996 Snook
(Continued)

FOREIGN PATENT DOCUMENTS

DE          9311280       10/1993
DE      102011114358       3/2013
(Continued)

OTHER PUBLICATIONS

Supplementary European Search Report dated Aug. 2, 2017 for Application No. 14839900.9 for Carbon Revolution Pty Ltd. 18 pages.

*Primary Examiner* — Jason R Bellinger
(74) *Attorney, Agent, or Firm* — Cesari and McKenna, LLP

(57) ABSTRACT

A center-lock attachment arrangement for use in attaching a composite wheel to a mount. TA front element includes an outer engagement surface engaging a center-lock fastening nut and an inner engagement surface engaging an outer side of a central attachment area of the composite wheel. The front element further includes an attachment aperture through which a center-lock fastener is inserted and a plurality of fastener apertures around the attachment. A backing element includes an outer engagement surface facing the mount and an inner engagement surface engaging with an inner side of the central attachment area. The backing element further includes an attachment aperture through which the center-lock fastener is inserted and a plurality of fastener apertures around the attachment aper- (Continued)

ture. Elongate fasteners received through the aligned apertures of the front and the backing element clamp the front and the backing element over and around the central attachment area.

20 Claims, 5 Drawing Sheets

(51) Int. Cl.
  *B60B 3/00* (2006.01)
  *B60B 3/16* (2006.01)
(52) U.S. Cl.
  CPC ........ *B60B 5/02* (2013.01); *B60B 2360/3416* (2013.01); *B60B 2900/311* (2013.01); *B60B 2900/325* (2013.01)

(56) References Cited

U.S. PATENT DOCUMENTS

| | | | | |
|---|---|---|---|---|
| 5,584,537 | A | * | 12/1996 | Miansian ................ B60B 3/142 301/105.1 |
| 5,820,224 | A | | 10/1998 | Dimatteo, Jr. |
| 5,887,952 | A | * | 3/1999 | Gandellini ................ B60B 3/02 301/35.58 |
| 6,116,700 | A | * | 9/2000 | Herrera ................... B60B 3/142 301/111.02 |

FOREIGN PATENT DOCUMENTS

| | | |
|---|---|---|
| GB | 1571825 | 7/1980 |
| JP | S63180401 | 11/1988 |
| WO | WO 2010/024495 A1 | 3/2010 |
| WO | WO 2013/000009 A1 | 1/2013 |

* cited by examiner

CENTRE-LOCK ATTACHMENT ARRANGEMENT FOR COMPOSITE WHEELS

CROSS-REFERENCE

The present application is the National Stage of International Application No. PCT/AU2014/000324, filed on 27 Mar. 2014, which claims priority from Australian provisional patent application No. 2013903314 filed on 30 Aug. 2013, the disclosure of both of which should be understood to be incorporated into this specification.

TECHNICAL FIELD

The present invention generally relates to a centre-lock arrangement for attaching one or more composite wheels to a mount. The invention is particularly applicable to attachment arrangements for carbon fibre wheels and it will be convenient to hereinafter disclose the invention in relation to that exemplary application.

BACKGROUND TO THE INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

Attaching composite structures to other components or structures can be challenging. Composite structures, such as carbon fibre components, are generally extremely strong and stiff in the fibre direction, but can have less stiffness and strength perpendicular to the fibre direction. Attachment holes for a bolted joint connection are generally formed perpendicular to the fibre direction. Compressive loads through a joint formed through such attachment holes will therefore be perpendicular to the fibres rather than aligned with them. The stiffness of the material perpendicular to the fibres is quite low. Consequently, a low clamping pressure is required between the head of a bolt/washer and a mount to which it is to be connected to avoid damage. High clamping pressures can damage composite material at or immediately adjacent a preformed attachment hole, causing delamination at or immediately adjacent the edge of that attachment hole. This makes it difficult to achieve a stiff joint with conventional attachment and fastening arrangements.

A washer may be used to distribute the load over a greater area. However, conventional flat washers provide an uneven load distribution about the attachment aperture. In most cases, the load is greater in the region closer to the head of the bolt, thus creating an undesirable high compression zone close to the edge of the attachment hole.

Special fastener combinations may therefore be used for composite structures. For example, International Patent Application No. PCT/AU2012/000598 filed by the present Applicant describes an attachment arrangement for a multiple bolted joint composite wheel having attachment apertures arranged evenly in a radial orientation around the rotational axis of the wheel. The attachment arrangement includes a fastening washer having a base configured to face a surface of the composite wheel about the attachment aperture and a fastening side having an engagement surface configured to operatively engage a complementary portion of a fastening nut when the fastening nut is assembled on an elongate fastener element. The fastening arrangement also includes a sleeve configured to extend into an attachment aperture of the composite wheel and be received in a complementary shaped sleeve aperture located in the mount or in an element located adjacent the mount.

A single central attachment feature is often used for high performance vehicles, particularly in racing applications. This is commonly referred to as a centre-lock attachment system. The attachment arrangement described in PCT/AU2012/000598 may not be ideally suited to a centre-lock attachment system as a scaled up version of this arrangement suitable for a centre-lock system may not effectively spread the clamping force away from the centre of the a centre-lock attachment aperture to a large enough contact area. A centre-lock form of this arrangement will therefore still provide an undesirable high compression zone close to the edge of the centre-lock attachment aperture of the composite wheel.

It would therefore be desirable to provide a centre-lock attachment arrangement for a composite wheel that overcomes one or more of the above limitations.

SUMMARY OF THE INVENTION

The present invention provides a centre-lock attachment arrangement for use in attaching at least one composite wheel to a mount using a centre-lock fastener and a centre-lock fastening nut which can be fastened on the centre-lock fastener.

The composite wheel includes a central attachment area having a central attachment aperture through which the centre-lock fastener is inserted, and a plurality of fastener apertures annularly spaced around the attachment aperture thereof.

The attachment arrangement includes a front element having an outer engagement surface which, in use, operatively engages the centre-lock fastening nut, and an inner engagement surface which, in use, operatively engages with the outer side of the central attachment area of the composite wheel. The front element also includes an attachment aperture through which the centre-lock fastener is inserted and a plurality of fastener apertures annularly spaced around the attachment aperture thereof. These fastener apertures are complementary to the fastener apertures of the central attachment area of the composite wheel.

The attachment arrangement also includes a backing element having an outer engagement surface which, in use, faces, preferably operatively engages with, the mount, and an inner engagement surface which, in use, operatively engages with the inner side of the central attachment area of the composite wheel. The backing element also includes an attachment aperture through which the centre-lock fastener is inserted and a plurality of fastener apertures spaced apart around the attachment aperture thereof, said fastener apertures being complementary to the fastener apertures of the central attachment area of the composite wheel.

The attachment arrangement further includes a plurality of elongate fasteners configured to be received through the aligned apertures of the front element and the backing element. In use, the elongate fasteners clamp the front element and the backing element over and around the central attachment area of the composite wheel.

The central attachment area of a composite wheel is substantially sandwiched between the front element and the backing element when the attachment arrangement of the present invention is assembled on a composite wheel. The front element, the backing element and the cooperating elongate fasteners function to spread the clamping force of a centre-lock wheel mount over a large area within the attachment region, and more particularly away from the center and edges of the central attachment aperture of composite wheel. Therefore, when the composite wheel is attached to the mount, the combination of the centre-lock clamping force and the clamping force generated by the elongate fasteners provides an evenly distributed clamping pressure between the mating surfaces of the front element and the front face of the wheel. This ensures that the centre-lock arrangement between the wheel and mount performs with minimal to no loss of attachment system performance during vehicle operation.

The distribution of clamping force between the front element and the backing element can be optimised by configuring the fastener apertures of the central attachment area, the front element and the backing element to be substantially evenly spaced apart, preferably evenly annularly spaced apart, around the respective attachment aperture. The clamping force of each individual elongate fastener therefore acts on a substantially equal area.

An even clamping force and pressure between the front element, backing element and the attachment region of the composite wheel is preferably attained when, in use, the moment in the front element between a clamping force produced by a centre-lock fastening connection, and in particular the centre-lock fastening nut, engaging the front element and a clamping force of each of the individual elongate fasteners is substantially zero, and more preferably equal to zero.

The spread of load away from the center and edges of the centre-lock aperture of the composite wheel is in part dependent on the radial distance the fastener apertures are spaced away from the attachment aperture (or the centre of the central attachment area of the composite wheel). The fastener apertures of the central attachment area, the front element and the backing element are therefore preferably radially spaced away from the center of the central attachment area of the composite wheel (being coaxial with the center of the composite wheel) by as great a radial spacing as can be accommodated for a particular design. In most designs, that radial spacing will be limited between the diameter of the attachment aperture of the composite wheel and by the size, preferably outer perimeter/diameter, of the mount on which the backing element abuts.

The central attachment aperture of the composite wheel is sized to fit a particular centre-locking system. For vehicle wheels, the central attachment aperture is typically sized between 40 to 100 mm in diameter, preferably between 60 to 80 mm. The fastener apertures of the central attachment area, the front element and the backing element are therefore preferably radially spaced away from the annular edge of the respective attachment aperture as great a radial spacing that can be accommodated for a particular design.

Additionally, as noted above, it is preferable to have a zero moment between a clamping force produced by a centre-lock fastener arrangement engaging the front element and a clamping force of each of the individual elongate fasteners in the front element. Accordingly, it is preferred that the fastener apertures of the central attachment area, the front element and the backing element are radially spaced away from the center of the central attachment area of the composite wheel between the annular center of an inner and outer diameter of the front element, and the outer diameter of the mount. As can be appreciated, the closer the fastener apertures are to the outer diameter of the mount, the greater the moments that can be produced by the elongate fasteners to oppose the clamping moment caused by the centre-lock fastener. The fastener apertures of the central attachment area, the front element and the backing element are therefore preferably radially spaced away from the center of the central attachment area of the composite wheel and more preferably close to the outer diameter of the mount.

The function of the attachment arrangement can be enhanced by preloading the elongate fasteners when the arrangement is assembled on the composite wheel. Preloading the elongate fasteners creates a preload between the backing element and the front element during the assembly. Generating sufficient preload force in the elongate fasteners provides strong and reliable joints that do not loosen or break under normal loading conditions.

The attachment apertures of each of the backing element, central attachment area of the composite wheel and the front element are configured to receive the centre-lock fastener along a fastening axis, which extends axially through the center of the central attachment aperture of the composite wheel. Once the centre-lock fastener is inserted fully through the respective aligned attachment apertures, the centre-lock fastening nut is tightened over the distal end of the centre-lock fastener extending out from the central attachment aperture of the front element. Tightening the fastening nut clamps the front element and the backing element around the overlapping sections of the central attachment area around or proximate the attachment apertures. The centre-lock fastening nut, the centre-lock fastener and the elongate fasteners therefore each cooperatively clamp the central attachment area between the front element and the backing element.

At least one of the front element or the backing element can further include a sleeve which extends axially relative to the fastening axis outwardly from the inner engagement surface about the attachment aperture of the respective front element or backing element. Each sleeve is preferably configured to extend into the attachment aperture of the composite wheel. The sleeve(s) function to distribute the load away from the centre of the attachment aperture of the composite wheel. Each sleeve can have any suitable configuration and, in particular, cross-section. In preferred forms, the sleeve has a circular or polygonal radial cross-section relative to the fastening axis.

The sleeve of the front element or the backing element may also include a distal end configured to be cooperatively received in a cooperating component of the respective backing element or front element. The length of the sleeve can then be selected to match the thickness of the central attachment area of the composite clamped between the front element and the backing element. In some embodiments, the length of the sleeve is selected to minimise compression or be subject to a designed compression of the composite material clamped between the front element and the backing element.

In other embodiments, each of the front element and the backing element include a section of said sleeve, the sleeve of the front element including a distal end configured to be cooperatively received in or around a distal end of the sleeve of the backing element. In some embodiments, the respective sleeves are configured to be cooperatively received in or around each other. The sleeves can be configured to be move freely when overlapping. However, in some embodiments at least one of the sleeves of the front element or the backing element may also include a stop element configured to limit the depth the distal end of the front element sleeve can be cooperatively received in or around the distal end of the backing element sleeve. The stop element can comprise any suitable formation, for example one or more steps, flanges, ribs or projections. The position of the stop element, and/or length of one or more of the sleeves can be selected to match the thickness of the central attachment area of the composite clamped between the front element and the backing element and/or to minimise compression or be subject to a selected to designed compression of the composite material clamped between the front element and the backing element.

Each of the front element, the backing element and the respective sleeve(s) can be integrally formed from a single piece of material, such as metal which could be cast, forged or machined from billet. In other embodiments, the front element, the backing element and the respective sleeve(s) can be formed from two or more separate elements which can be joined together to form the attachment arrangement of the present invention.

The elongate fasteners can comprise any suitable interlocking fastening arrangement with a fastening nut or other interlocking recess. In preferred embodiments, the elongate fasteners comprise a screw or bolt type fastener having a head and an elongate body attached to the head. The elongate fastener is designed to cooperate with a nut or interlocking recess which is formed in or operatively engages with the front element or the backing element. The head of the elongate fastener can be locked or otherwise secured to the front element or the backing element. In use, the elongate body of each elongate fastener is inserted through the respective fastener apertures of the backing element, the attachment area of the composite wheel, and the front element. The distal end of the elongate fastener can be locked or otherwise secured in a nut or interlocking recess operatively engaged or formed in the other of the backing element or front element, thereby clamping the front element and the backing element together.

In preferred embodiments, the fastener apertures of the front element are configured to receive and fasten a distal end of a respective elongate fastener therein. In these embodiments, the elongate fasteners preferably include an external threaded surface and the fastener apertures of the front element preferably include a complementary internal threaded bore. The fastener apertures of the front element can comprise blind bores or may comprise through bores.

In some embodiments, each fastener aperture of the backing element is configured to receive and substantially recess a head of each respective elongate bolt within the fastener aperture. The fastener apertures of the backing element preferably include a stop feature such as a step, flange, projection, pimple or spigot of which a stop surface of the head, preferably the base of the head, engages when received in the fastener aperture in order to retain the head of the elongate fastener within the backing element. In preferred embodiments, the fastener apertures of the backing element comprise a stepped bore to provide an internal step surface configured to engage the stop surface of a head of an elongate fastener received within the fastener aperture and retain the head within the fastener aperture.

The head of each elongate fastener preferably includes a manipulation feature to enable the bolt to be rotated. The manipulation feature can comprise any suitable feature in the head or other portion of the elongate fastener which can be used to rotate the elongate fastener within the fastener aperture. In some embodiments, the manipulation feature comprises a shaped element, for example one or more grooves, detents, trench, cavity, projection, rib, spigot, flange or pimple. Where the manipulation feature comprises a cavity or recess, the recess can have any suitable shape, for example polygonal shapes such as triangular, square, pentagonal, hexagonal or the like.

In some embodiments, the elongate fasteners are operatively associated with the wheel mount preferably the drive system of a vehicle. This operative association preferably enables the elongate fasteners to function as torque transfer or drive pins for transferring torque from the wheel mount/drive system to the composite wheel. In some embodiments, the elongate fasteners form part of the drive pin arrangement attached to the wheel mount and/or drive arrangement of a vehicle. This allows the elongate fasteners to be used as drive pins. In other embodiments, the elongate fasteners are configured to operatively engage with the drive pins of a vehicle, for example, through a cooperatively configured connector arrangement or the like.

The inner engagement surfaces of each of the front element and the backing element may comprise part of, or the entirety of an inner side of the respective element. The inner engagement surfaces of each of the front element and the backing element are preferably configured to transfer compression force from the elongate fasteners and centre-lock fastener and centre-lock nut through to composite wheel. The inner engagement surfaces can therefore have a complementary configuration to the surface of the composite wheel it faces. More preferably, the inner engagement surfaces have complementary contours and features to the surface of the composite wheel about the attachment aperture. For example, where the surface of the attachment area of the composite wheel is substantially flat, the inner engagement surfaces can include a substantially flat engagement surface or surfaces. These surfaces can be configured to abut the surface of the composite wheel about the attachment aperture.

In some embodiments, the outer engagement surface of the front element includes a tapered portion or chamfer. The tapered portion preferably comprises an annular surface which axially tapers from a larger diameter to a smaller diameter from the outer facing side towards the inner facing side (including the inner engagement surface). The tapered portion of the outer engagement surface of the front element is configured to engage and cooperate with a complementary taper or chamfer located on an engagement face of the fastening nut. When the fastening nut is tightened around the distal end of the centre-lock fastener, the tapered portion of the outer engagement surface engages with the chamfer of the fastening nut. The taper of these surfaces directs the clamping force of this engagement at an angle away from the attachment aperture.

The front element and the backing element can have any suitable configuration. In some embodiments, the front element and the backing element are annulus or ring shaped. In some embodiments, one or both of the front element and the backing element comprise plates.

The front element functions to transfer clamping force from the centre-lock nut across the attachment area of the composite wheel clamped between the front element and the backing element.

In some embodiments, the front element includes a nut recess configured to receive the fastening nut. The nut recess can have any suitable shape and configuration (cross-sectional shape relative to the fastening axis or similar) which can receive the front element. The recess is preferably a complementary shape to the front element. Suitable cross-sectional shapes include polygonal shapes such as triangular, square, pentagonal, hexagonal, or the like. In some embodiments, the recess has a circular cross-sectional shape. In some embodiments, the nut recess is formed in an outer sleeve which extends outwardly relative to the outer engagement surface of the front element.

The front element can include in some embodiments one or more radial reinforcement elements, preferably ribs, extending from the nut recess to the location of each of the fastener apertures in the front element. The ribs assist in transferring forces from the sleeve to the body of the front element and through to the elongate fasteners.

It should be understood that the mount can be a support, backing, setting, or the like, on or in which something is, or is to be, mounted or fixed. In preferred embodiments, the mount would be a wheel mount (or wheel hub) for the composite wheel. The mount can have any suitable centre-lock configuration. The mount typically includes a centre-lock fastener extending outwardly from the mounting surface. In some embodiments, the mount further includes a plurality of annularly spaced apart torque transmission members, typically pins or rods, annularly spaced around the centre-lock fastener.

In some embodiments, the attachment area of the composite wheel and backing element include a plurality of mount apertures annularly spaced around the attachment aperture thereof. The mount apertures are provided to receive a torque transmission feature associated with the mount. In preferred embodiments, the torque transmission feature comprises a plurality of annularly spaced apart elongate elements, preferably pins or rods, more preferably drive pins or rods. The mount apertures are cooperatively positioned in the attachment area of the composite wheel and backing element to align and receive the rods when the composite wheel and attachment arrangement are fitted to the mount. The front element may also include a cooperating formation, preferably a recess complementary aligned with the mount apertures of the attachment area and backing element.

Embodiments of the present invention may further include a centre-lock fastener and a centre-lock fastening nut which can be fastened on the centre-lock fastener. In use, the centre-lock fastener and fastening nut cooperating with the elongate fasteners to cooperatively clamp the front element and the backing element over and around the central attachment area of the composite wheel.

The configuration of the composite wheel used with the attachment arrangement of the present invention can be designed to accommodate the attachment arrangement. For example, the composite wheel may include a recess in the central attachment area of the composite wheel in which the front element can be located. The recess can be any suitable shape which can receive the front element. The recess is preferably a complementary shape to the front element. In some embodiments, the recess is circular.

The composite wheel fastened using the attachment arrangement of the present invention can be any composite material in which compression joint damage can occur, for example, a fibre reinforced composite such as, but not limited to, a carbon fibre composite material or carbon/epoxy composite. It should however be understood that other types of composite materials other than carbon fibre and epoxy resin could be used in the composite wheels of the present invention which use the same joint. One preferred application is for attaching the composite wheel to a wheel mount, and more preferably one or more fibre composite wheels, for example carbon composite fibre wheels. The composite wheels are preferably mountable to a vehicle such as an automobile, truck or the like.

It should be appreciated, that in addition to the above described advantages, the attachment arrangement of the present invention enables the composite wheel to have an extremely stiff fastening to the mount relative to the fastening nut without damaging the composite wheel.

BRIEF DESCRIPTION OF THE DRAWINGS

The present invention will now be described with reference to the figures of the accompanying drawings, which illustrate particular preferred embodiments of the present invention, wherein.

DETAILED DESCRIPTION

Figure 1:
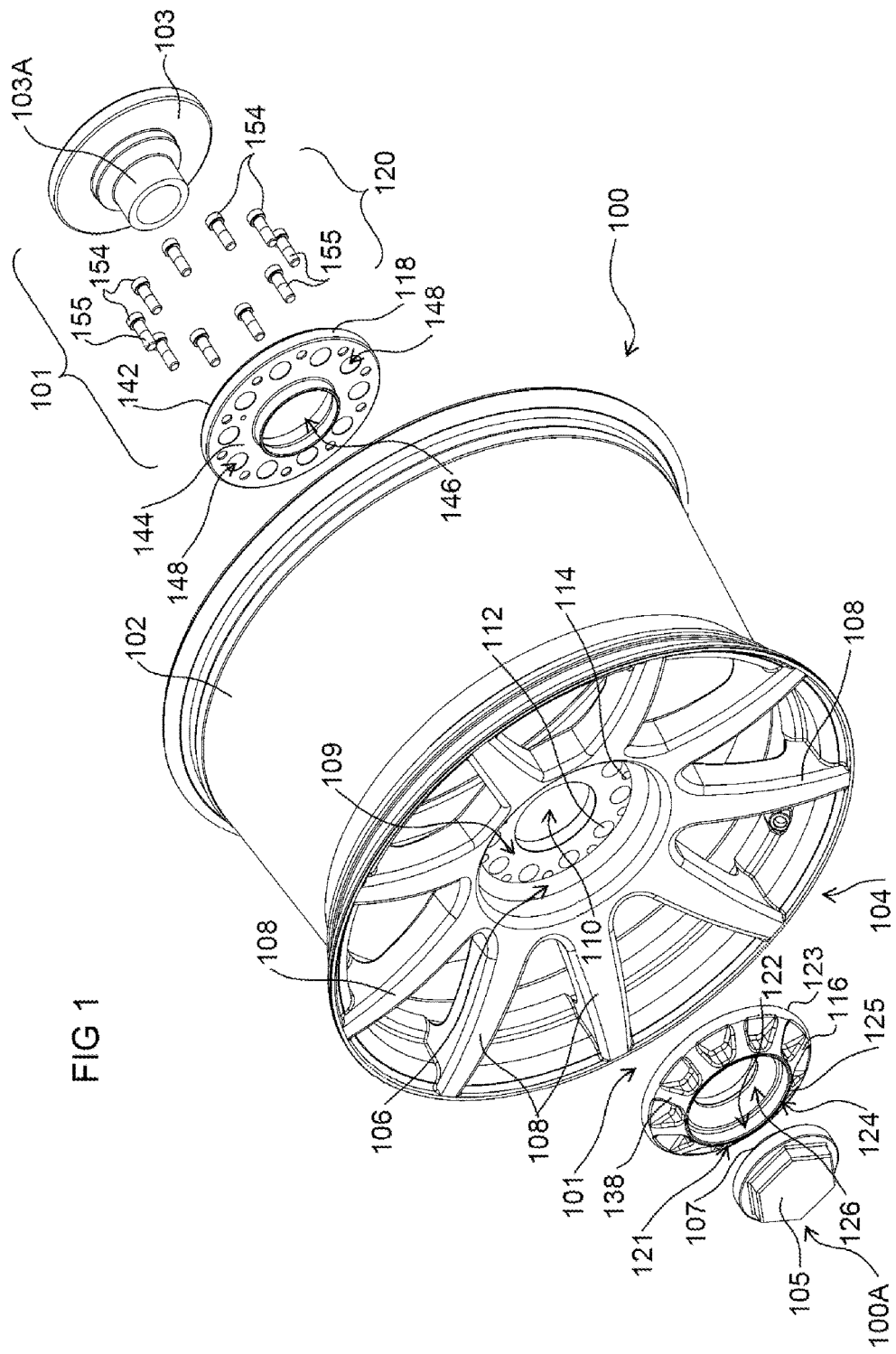
FIG. 1 provides a perspective exploded view of a centre-lock configured carbon fibre wheel, and centre-lock wheel attachment arrangement which connects the wheel to a wheel mount (not illustrated) according to a first preferred embodiment of the present invention.
Figure 2:
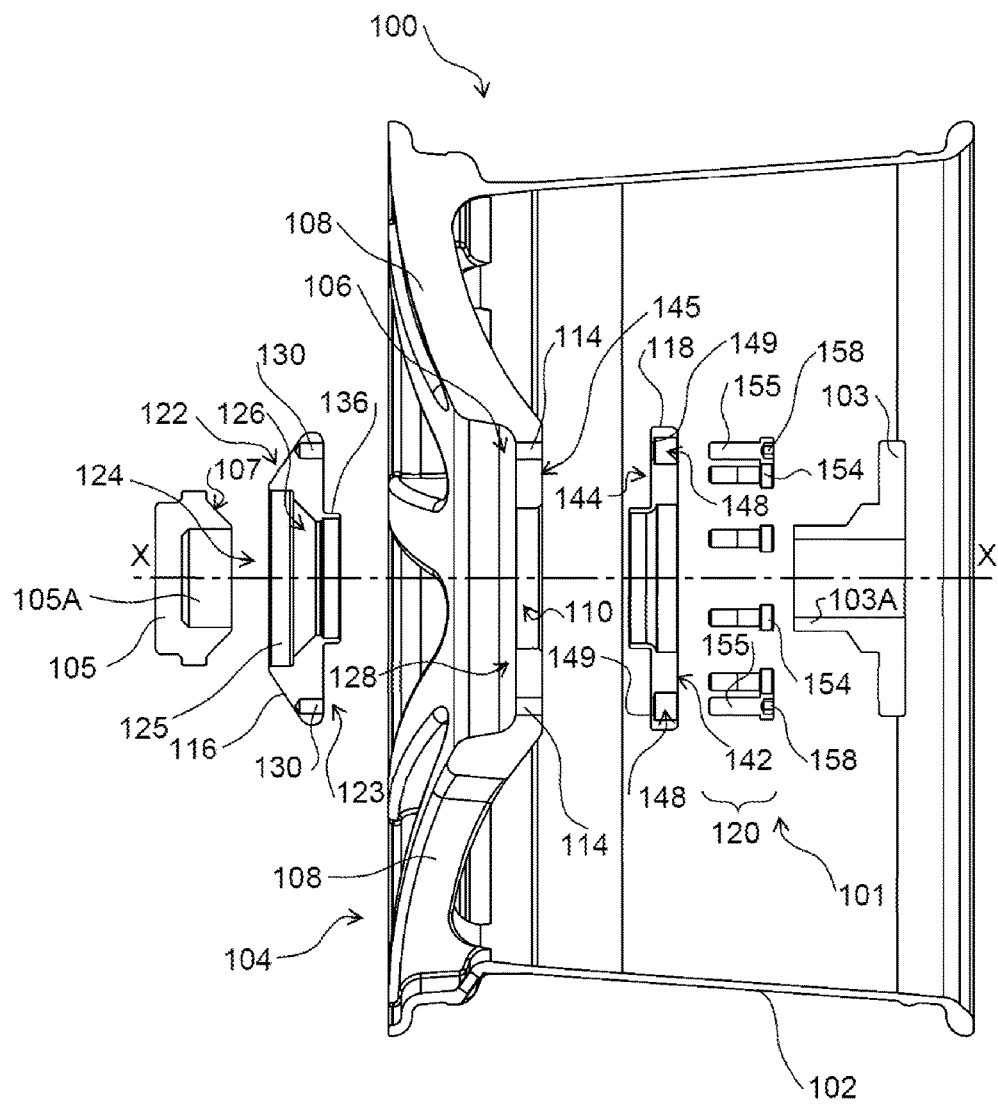
FIG. 2 provides a side cross-sectional view of the carbon fibre wheel and the centre-lock attachment wheel attachment arrangement shown in FIG. 1.

FIGS. 1 and 2 illustrate a centre-lock carbon fibre composite wheel 100 which can be attached to a wheel mount or wheel hub (not illustrated) utilising a centre-lock wheel fastening system 100A which includes a centre-lock attachment arrangement 101 according to a preferred embodiment of the present invention.

The illustrated centre-lock wheel fastening system 100A includes a central centre-lock fastening mount 103 providing a circular hub which includes a centre-lock stud 103A which receives a centre-lock fastening nut 105 over its distal end to lock a wheel received on the fastening fastener/stud 103A onto that fastening fastener/stud 103A. The centre-lock fastening stud 103A is typically an elongate externally threaded pin or rod having a complementary thread to a threaded internal bore 105A (FIG. 2) of the centre-lock fastening nut 105. The centre-lock wheel fastening system 100A often includes a plurality of torque transfer or drive pins or rods (not illustrated) radially spaced away from and annularly spaced apart around the central fastening stud 103A.

The illustrated composite wheel 100 is a one piece carbon fibre wheel. An example of one suitable composite wheel 100 is a carbon fibre wheel developed by the Applicant formed as a one-piece body. The general process of manufacture of this composite wheel 100 is described in International Patent Publication WO2010/024495A1, the contents of which are to be understood to be incorporated into this specification by this reference.

The illustrated composite wheel 100 includes two main sections:

A). a rim portion 102 comprises an substantially cylindrically shaped structure onto which a tyre (not illustrated) is mounted; and B). a face portion 104 comprising a circular hub 106 and a series of spokes 108.

The spokes 108 comprise elongate arms connected to the hub 106 at one end and the rim portion 102 at another end.

The hub 106 comprises a circular recessed area in the center of the face portion 104, having a central attachment area 109 having a central attachment aperture 110 through which the centre-lock fastener (not illustrated) of the wheel mount 103 is inserted when the wheel 100 is mounted on the wheel mount 103. The central attachment aperture 110 of the composite wheel 100 is sized to fit a particular centre-locking system. The central attachment aperture 110 is typically sized between 40 to 100 mm in diameter, preferably between 60 to 80 mm. The composite wheel 100, central attachment area 109 and central attachment aperture 110 all include a co-axial centre having central axis X-X extending axially through that centre.

The hub 106 also includes ten annularly spaced apart torque transfer apertures 112 configured to receive complementary aligned torque transfer pins/rods (not illustrated) fixed to or otherwise spaced around the wheel mount 103. The torque transfer apertures 112 are preferably radially spaced as far away from the central axis X-X of the composite wheel as allowed by the design of the vehicle hub.

The hub 106 also includes ten annularly spaced apart fastener apertures 114 also annularly spaced around the attachment aperture 110 thereof. The fastener apertures 114 are radially positioned further away from the central axis X-X relative to the torque transfer apertures 112. As best shown in FIG. 1, the fastener apertures 114 are also positioned annularly between each torque transfer aperture 112. The fastener apertures 114 are therefore preferably radially spaced away as from the central axis X-X of the composite wheel 100 as far as is allowed by the design of the vehicle hub.

The illustrated attachment arrangement 101 comprises an interengageable set comprising a front element 116, a backing element 118 and a plurality (in the illustrated embodiment ten) fastening bolts 120.

The illustrated front element 116 comprises a circular body having an outer side 122 which faces outwardly relative to the composite wheel 100 when assembled thereon and an inner side 123 which faces towards and abuts the composite wheel 100 when assembled thereon. An attachment aperture 121 is provided in the center of the front element 116 configured to align with the attachment aperture 110 of the composite wheel 100 when assembled thereon, and configured to receive the centre-lock stud 103A.

The outer side 122 includes a circular nut recess 124 (FIGS. 1 and 2) configured to receive the fastening nut 105. The nut recess 124 is formed in an outer sleeve 125, and as best illustrated in FIG. 2 includes an outer engagement surface 126 which, in use, operatively engages the centre-lock fastening nut 105. Again, as best seen in FIG. 2, the outer engagement surface 126 includes an annular chamfer configured to engage and cooperate with a complementary taper or chamfer located on an engagement face 107 of the fastening nut 105.

The inner side 123 provides an inner engagement surface which, in use, operatively engages with the outer side 128 of the central attachment area 109 of the composite wheel 100. The inner side 123 also includes a plurality of fastener apertures 130 annularly spaced around the attachment aperture 121 thereof. The fastener apertures 130 of the front element 116 are complementarily configured and aligned with the fastener apertures 114 of the central attachment area 109 of the composite wheel 100. The illustrated fastener apertures 130 of the front element 116 comprise internally threaded blind bores configured to receive and fasten a distal end of a respective fastening bolt 120 therein. As is detailed below, the fastening bolts 120 include an external threaded surface 135. The fastener apertures 130 of the front element 116 include a complementary internally threaded bore.

The inner side 123 of the front element 116 also includes a cylindrical sleeve 136 which extends axially relative to the central axis X-X outwardly from the inner side 123 about the attachment aperture 121 of the front element 116. The sleeve 136 is configured to extend into the attachment aperture 110 of the composite wheel 100. Whilst not significant in the illustrated embodiment, in other embodiments, the sleeve 136 can function to distribute the load away from the centre of the attachment aperture 110 of the composite wheel 100.

Figure 3:
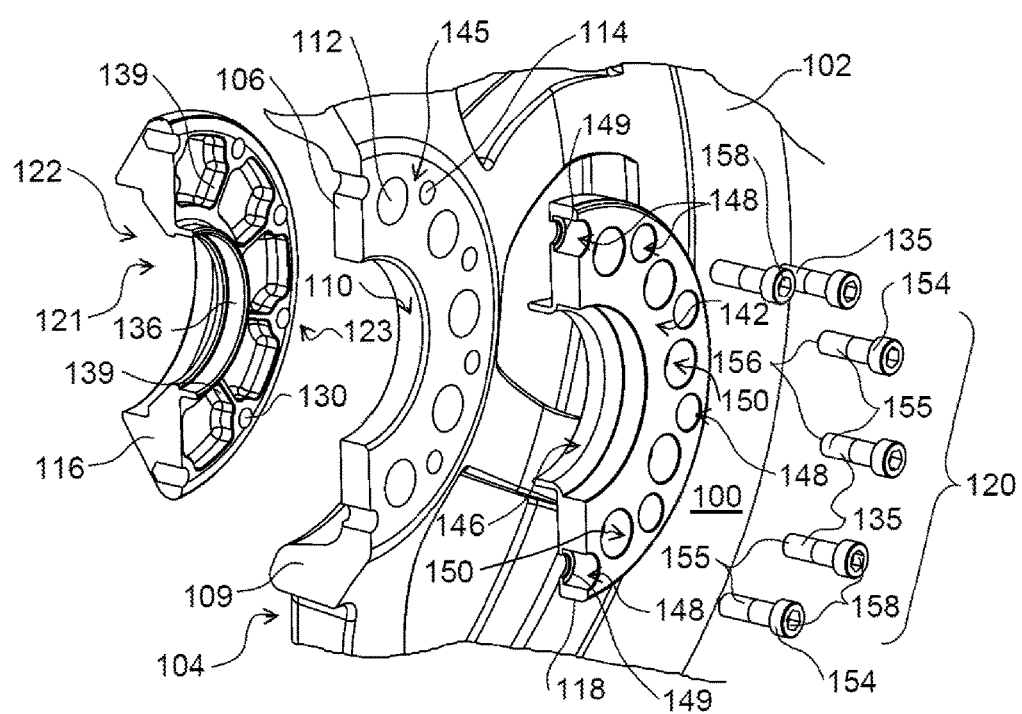
FIG. 3 provides an enlarged cut out perspective exploded view of the carbon fibre wheel and the centre-lock attachment wheel attachment arrangement shown in FIG. 1.
Figure 4:
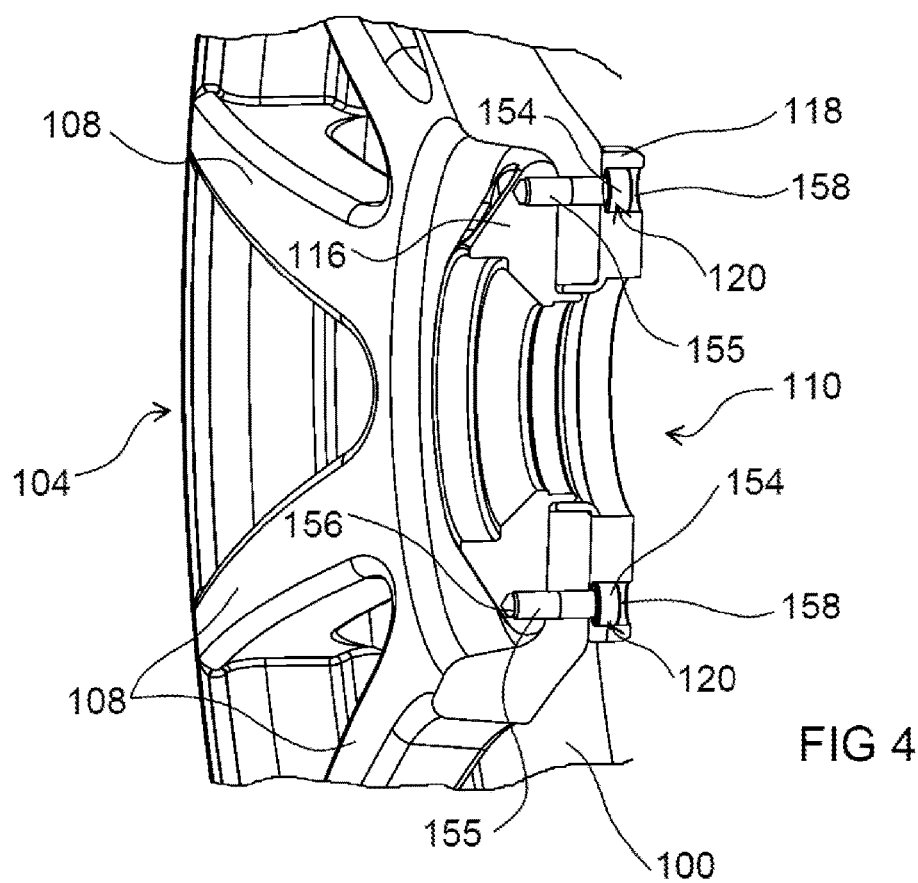
FIG. 4 provides a cross-sectional perspective view of the centre-lock attachment wheel attachment arrangement shown in FIG. 1 fitted the carbon fibre wheel.

As best illustrated in FIGS. 1 and 3, the outer side 122 and inner side 123 of the front element 116 include a plurality of radial reinforcement ribs 138, 139, extending from the nut recess 124 to the location of each of the fastener apertures 130 on the outer side 122 of the front element 116 and extending from the sleeve 136 to the location of each of the fastener apertures 130 on the inner side 122 of the front element 116. The ribs 138, 139 assist in transferring forces from the sleeve 136 to the body of the front element 116 and through to the elongate fasteners 120. The ribs 139 of the inner side 123 of the front element 116 define recesses in the inner side 123 of the front element 116 which can receive the distal end of torque transfer rods inserted through the respective torque transfer apertures 112, 150 of the central attachment area 109 of the composite wheel 100 and the backing element 118.

The illustrated backing element 118 comprises a ring or annulus shaped plate having an outer engagement surface 142 which, in use, operatively engages with the mount, and an inner engagement surface 144 which, in use, operatively engages with the inner side 145 (FIG. 2) of the central attachment area 109 of the composite wheel 100. An attachment aperture 146 is provided in the center of the backing element 118 configured to align with the attachment aperture 110 of the composite wheel 100 when assembled thereon, and configured to receive the centre-lock fastener 103A.

A plurality of fastener apertures 148 are provided annularly spaced around the attachment aperture 146 thereof. The fastener apertures 148 of the backing element 118 are also complementarily configured and aligned with the fastener apertures 114 of the central attachment area 109 of the composite wheel 100. Each fastener aperture 148 of the backing element 118 is configured to receive and substantially recess a head 154 of each respective fastening bolt 120. As best illustrated in FIG. 2, the bore of each fastener aperture 148 is stepped to provide an internal step surface 149 configured to engage the head 154 of an elongate fastener 120 received within the fastener aperture 148 and retain the head 154 within the fastener aperture 148.

The backing element 118 includes a plurality of torque transfer apertures 150 are also provided annularly spaced around the attachment aperture 146 thereof. The torque transfer apertures 150 of the backing element 118 are complementarily configured and aligned with the torque transfer apertures 112 of the central attachment area 109 of the composite wheel 100.

The backing element 118 also includes a cylindrical sleeve 152 which extends axially relative to the central axis X-X outwardly from the inner engagement surface 144 of the backing element 118 about the attachment aperture 146 of the backing element 118. The sleeve 152 is configured to extend into the attachment aperture 109 of the composite wheel 100. Like the sleeve 136 of the front element 116, whilst not significant in the illustrated embodiment, the sleeve 152 of the backing element 118 can in other embodiments function to distribute the load away from the centre of the attachment aperture 110 of the composite wheel 100. In such embodiments, the sleeve 152 would assist in pressure distribution using interference or the like with the engaged surface.

Figure 5:
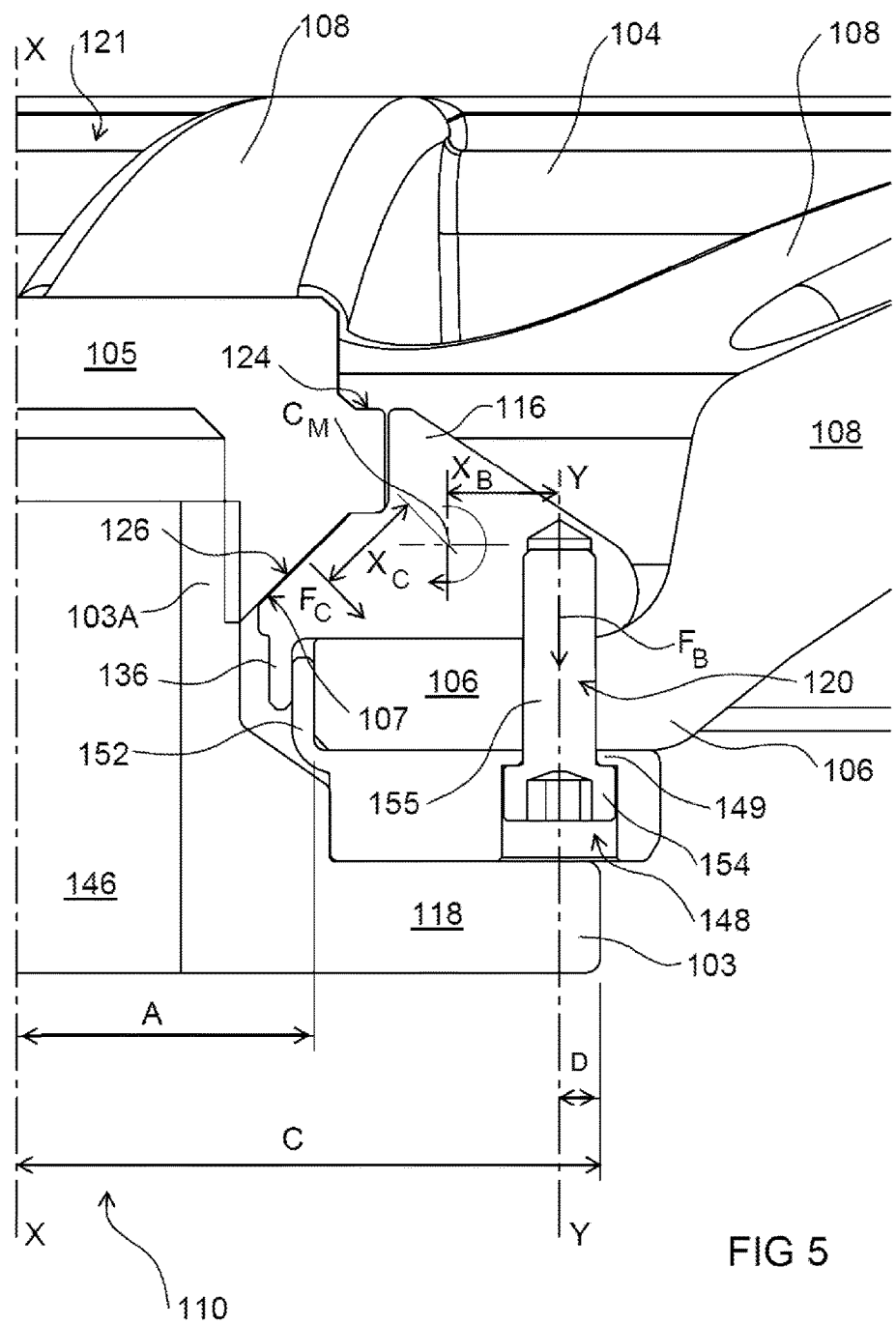
FIG. 5 provides an enlarged cross-sectional perspective view of the overlapping sleeves of the elements of the centre-lock attachment wheel attachment arrangement shown in FIG. 4.

As best shown in FIG. 5, the front element sleeve 136 and backing element sleeve 152 are configured to overlap, to form a continuous sleeve within the central attachment aperture 110 when the attachment arrangement 101 is assembled on a composite wheel 100. The front element sleeve 136 is cooperatively received within the backing element sleeve 152. The sleeves 136, 152 are designed to move freely when overlapping.

The fastening bolts 120 of the illustrated attachment arrangement 101 comprise a bolt type fastener configured to be received through the respectively aligned fastener apertures 130, 114 and 149 of the front element 116, the central attachment area 109 and the backing element 118. In use, the fastening bolts 120 clamp the front element 116 and the backing element 118 over and around the central attachment area 109 of the composite wheel 100. The illustrated fastening bolts 120 include a cylindrical head 154 and elongate body 155 attached to the head 154. As shown best in FIG. 3, the head 154 of each fastening bolts 120 include a hexagonal recess 158 (best shown in FIG. 3) which can be used to rotate the fastening bolts 120, for example when inserted within a fastener apertures 148, 114, and 130. The elongate body 155 includes an external threaded surface 135 as previously noted. The fastening bolts 120 are designed to cooperate with the internal thread of the fastening aperture 130 of the front element 116. In use, the elongate body 155 of the fastening bolts 120 is inserted through the respective fastener apertures 148, 114, 130 of the backing element 118, the attachment area 109 of the composite wheel 100 and the front element 116. The distal end 156 of the fastening bolts 120 can be locked or otherwise secured in the fastening aperture 130 of the front element 116, thereby clamping the front element 116 and the backing element 118 together.

The fastening bolts 120 are preferably preloaded when the arrangement is assembled on the composite wheel 100 thereby creating a preload between the backing element 118 and the front element 116 during the assembly.

When assembling the attachment arrangement 101 on the composite wheel 100, the respective attachment apertures 146, 110, 121 and fastener apertures 148, 114, 130 of each of the backing element 118, the central attachment area 109 of the composite wheel 100 and the front element 116 are aligned, and the central attachment area 109 of the composite wheel 100 is substantially sandwiched between the front element 116 and the backing element 119. The fastening bolts 120 are then inserted into the respectively aligned fastener apertures 148, 114, 130, and are tightened including a preloading procedure.

In order to fit the composite wheel 100 and attached attachment arrangement 101 to a wheel mount (for example a wheel mount of a vehicle), the centre-lock stud/fastener 103A is inserted fully through the respective aligned attachment apertures 146, 110, 121 and the centre-lock fastening nut 105 is tightened over the distal end of the centre-lock stud 103A of the centre-lock mount 103. When the fastening nut 105 is tightened around the distal end of the centre-lock stud 103A, the chamfer of the outer engagement surface 126 engages with the cooperating chamfer 107 of the fastening nut 105. The taper of these surfaces directs the clamping force of this engagement at an angle away from the attachment aperture 110 of the composite wheel 100. Tightening the fastening nut 105 clamps the front element 116 and the backing element 119 around the overlapping sections of the central attachment area 109 around or proximate the attachment aperture 110 of the composite wheel 100. The centre-lock fastening nut 105, the centre-lock stud 103A and mount 103 and the elongate fasteners 120 therefore each cooperatively clamp the central attachment area 109 between the front element 118 and the backing element 119. This co-operative clamping functions to spread the clamping force over a large area within the central attachment area 109, and more particularly away from the center and edges of the attachment aperture 110 of the composite wheel 100.

As best illustrated in FIG. 5, an even clamping pressure is preferably attained when, in use, the moment M in the front element between a clamping force $F_C$ produced by the centre-lock fastening nut 105 engaging the front element 116 and a clamping force $F_B$ of each of the individual elongate fasteners 120 is substantially zero. As shown in FIG. 5, clamping force $F_B$ acts at a distance of $x_B$ from the center of moment of the two forces, and clamping force $F_C$ acts at a distance of $X_C$ from the center of moment of the two forces. Accordingly, moment $F_B \times X_B$ should equal $F_C \times X_C$ to produce a zero moment in the front element 116.

As previously noted, the fastener apertures 148, 114, 130 of each of the backing element 118, the central attachment area 109 of the composite wheel 100 and the front element 116 are therefore preferably radially spaced away from the center X-X of the central attachment area of the composite wheel 100 by as great a radial spacing that can be accommodated for a particular design. In most designs, that radial spacing will be constrained between the radius A of the attachment aperture 110 of the composite wheel 100 and the outer radius C of the mount 103 on which the backing element 118 abuts. In order to satisfy the zero moment between clamping force $F_C$ produced by the centre-lock fastening nut 105 engaging the front element 116 and a clamping force $F_B$. The fastener apertures 148, 114, 130 are preferably radially spaced away from the center X of the central attachment area 109 of the composite wheel 100 close to the outer radius C of the mount 103. As shown in FIG. 5, the centre line Y-Y of the fastener apertures 148, 114, 130 is positioned a short distance D away from the outer radius C of the mount 103.

While not illustrated, it should be appreciated that the illustrated embodiment could be modified so that the elongate fasteners form part of the drive pin arrangement attached to the wheel mount and/or drive arrangement of a vehicle. This allows the elongate fasteners to be used as drive pins if the vehicle system and wheel system, particularly where the composite wheel and vehicle have been designed concurrently. In other embodiments, the elongate fasteners are configured to operatively engage with the drive pins of a vehicle, for example, through a cooperatively configured connector arrangement or the like. In such embodiments, separate apertures would not be required for the torque transfer apertures and fastening apertures of the composite wheel and centre-lock attachment arrangement. In this embodiment, these only a single set of apertures could be used for both.

It should be appreciated that the illustrated attachment arrangement 101 including the front element 116, the backing element 118 and the fastening bolts 120 can be formed from any suitable material. Preferably, that material is stiffer than the composite material of the composite wheel, more preferably has a higher compression modulus. Suitable materials include aluminium, iron, steel, titanium, magnesium and alloys thereof.

While the illustrate embodiment relates to a carbon fibre wheel 100, it should be appreciated that the illustrated attachment arrangement could be adapted for use with any similar type of composite material, structure or component which is designed to be fastened to a mount and in which compression joint damage can occur.

Those skilled in the art will appreciate that the invention described herein is susceptible to variations and modifications other than those specifically described. It is understood that the invention includes all such variations and modifications which fall within the spirit and scope of the present invention.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

The invention claimed is:

1. A centre-lock attachment arrangement configured to attach at least one composite wheel to a mount using a centre-lock fastener and a centre-lock fastening nut which can be fastened on the centre-lock fastener, the composite wheel including a central attachment area having a composite wheel central attachment aperture through which the centre-lock fastener is inserted, and a plurality of composite wheel fastener apertures annularly spaced around the composite wheel central attachment aperture, the centre-lock attachment arrangement including:
    a front element including a front element outer engagement surface configured to engage the centre-lock fastening nut, and a front element inner engagement surface configured to engage with an outer side of the central attachment area of the composite wheel, the front element including a front element attachment aperture through which the centre-lock fastener is inserted and a plurality of front element fastener apertures annularly spaced around the front element attachment aperture, said front element fastener apertures being complementary to the composite wheel fastener apertures of the central attachment area of the composite wheel;
    a backing element including a backing element outer engagement surface configured to face the mount, and a backing element inner engagement surface configured to engage with an inner side of the central attachment area of the composite wheel, the backing element including a backing element attachment aperture through which the centre-lock fastener is inserted and a plurality of backing element fastener apertures spaced apart around the backing element attachment aperture, said backing element fastener apertures being complementary to the composite wheel fastener apertures of the central attachment area of the composite wheel; and
    a plurality of elongate fasteners configured to be received through the plurality of front element fastener apertures and the plurality of backing element fastener apertures which are aligned, the plurality of elongate fasteners configured to clamp the front element and the backing element over and around the central attachment area of the composite wheel.

2. The centre-lock attachment arrangement according to claim 1, wherein the plurality of composite wheel fastener apertures of the central attachment area, the plurality of front element fastener apertures, and the plurality of backing element fastener apertures are substantially evenly spaced apart around the composite wheel central attachment aperture, the front element attachment aperture, and backing element attachment aperture, respectively.

3. The centre-lock attachment arrangement according to claim 1, wherein the elongate fasteners are pre-loaded when the arrangement is assembled on the composite wheel.

4. The centre-lock attachment arrangement according to claim 1, wherein a moment in the front element between a first clamping force produced by the centre-lock fastening nut engaging the front element and a second clamping force of each of the individual elongate fasteners is substantially zero.

5. The centre-lock attachment arrangement according to claim 1, wherein the mount which engages the backing element includes an outer diameter and the plurality of composite wheel fastener apertures, the plurality of front element fastener apertures, and the plurality of backing element fastener apertures are radially spaced away from a centre of the central attachment area of the composite wheel between an annular centre of an inner and outer diameter of the front element, and the outer diameter of the mount.

6. The centre-lock attachment arrangement according to claim 1, wherein the composite wheel central attachment aperture includes a fastening axis along which the centre-lock fastener extends when inserted in the composite wheel central attachment aperture, and wherein at least one of the front element or the backing element further includes a sleeve which either extends axially relative to the fastening axis outwardly from the front element inner engagement surface about the front element attachment aperture or extends axially relative to the fastening axis outwardly from the backing element inner engagement surface about the backing element attachment aperture, the sleeve being configured to extend into the composite wheel central attachment aperture.

7. The centre-lock attachment arrangement according to claim 1, wherein the plurality of front element fastener apertures are configured to receive and fasten a distal end of a respective elongate fastener therein.

8. The centre-lock attachment arrangement according to claim 1, wherein the plurality of front element fastener apertures comprise blind bores.

9. The centre-lock attachment arrangement according to claim 1, wherein each elongate fastener includes a head and an elongate body attached to the head, and wherein the backing element fastener apertures comprise a stepped bore to provide an internal step surface configured to engage a stop surface of the head of the elongate fastener received within a backing element fastener aperture and retain the head within the backing element fastener aperture.

10. The centre-lock attachment arrangement according to claim 9, wherein each backing element fastener aperture is configured to receive and substantially recess the head of each respective elongate fastener within the backing element fastener aperture.

11. The centre-lock attachment arrangement according to claim 1, wherein the elongate fasteners include an external threaded surface and the plurality of front element fastener apertures include a complementary internal threaded bore.

12. The centre-lock attachment arrangement according to claim 1, wherein the elongate fasteners are assembled with the wheel mount of a vehicle.

13. The centre-lock attachment arrangement according to claim 1, wherein at least one of the front element inner engagement or the backing element inner engagement includes a substantially planar engagement surface configured to abut a surface of the composite wheel about the composite wheel central attachment aperture.

14. The centre-lock attachment arrangement according to claim 1, wherein the front element and the backing element are annulus or ring shaped.

15. The centre-lock attachment arrangement according to claim 1, wherein the front element includes a nut recess configured to receive the centre-lock fastening nut.

16. The centre-lock attachment arrangement according to claim 15, wherein the nut recess is formed in an outer sleeve, the outer sleeve extending axially outwardly relative to the outer engagement surface of the front element.

17. The centre-lock attachment arrangement according to claim 1, wherein the central attachment area of the composite wheel and the backing element include a plurality of mount apertures annularly spaced around the composite wheel central attachment aperture.

18. The centre-lock attachment arrangement according to claim 17, wherein the front element includes a recess complementary aligned with the mount apertures of the central attachment area and the backing element.

19. The centre-lock attachment arrangement according to claim 1, further including the centre-lock fastener and the centre-lock fastening nut which can be fastened on the centre-lock fastener, wherein the centre-lock fastener and the centre-lock fastening nut cooperate with the elongate fasteners to cooperatively clamp the front element and the backing element over and around the central attachment area of the composite wheel.

20. The centre-lock attachment arrangement according to of claim 1, wherein the composite wheel comprises a carbon fibre composite wheel.

* * * * *